No. 878,839.	PATENTED FEB. 11, 1908.
G. A. WALKER.
ICE TONGS.
APPLICATION FILED SEPT. 21, 1907.
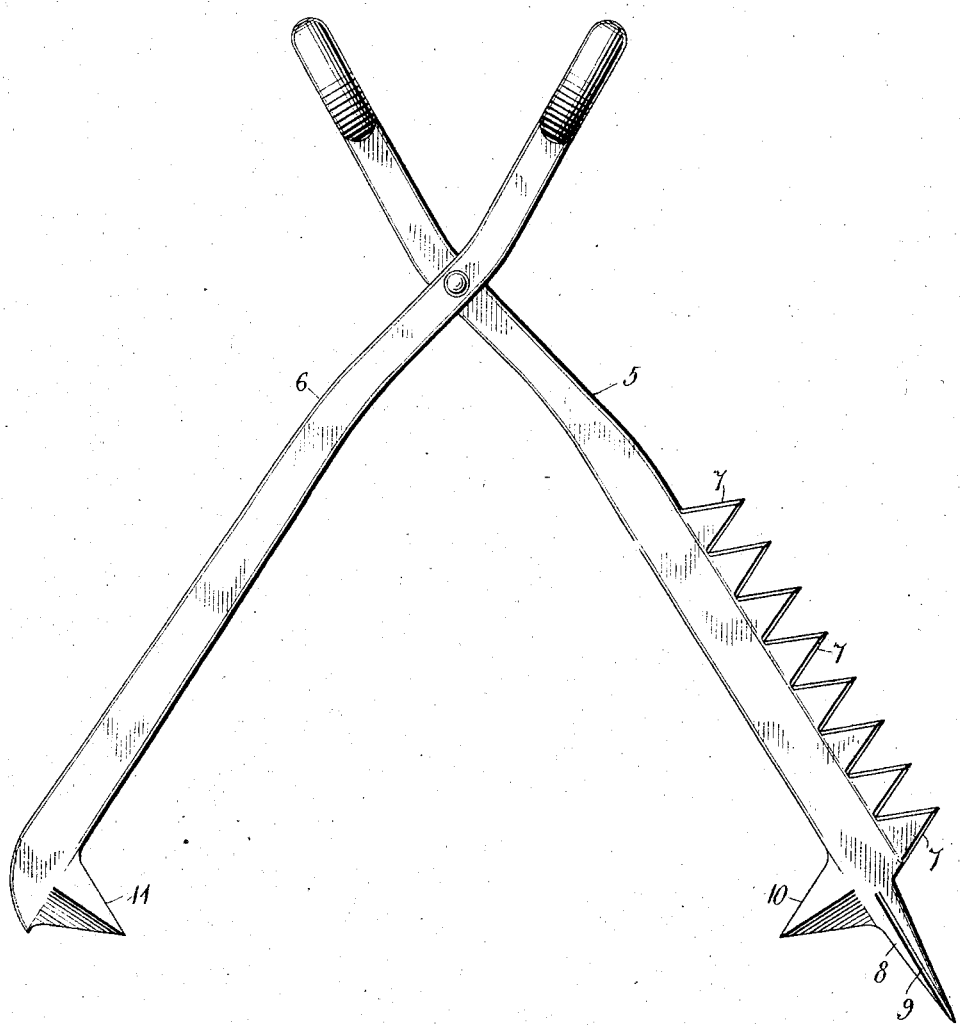
Witnesses
Inventor
George A. Walker
By
Attorneys

UNITED STATES PATENT OFFICE.

GEORGE A. WALKER, OF JET, OKLAHOMA.

ICE-TONGS.

No. 878,839.  Specification of Letters Patent.  Patented Feb. 11, 1908.

Application filed September 21, 1907. Serial No. 393,988.

*To all whom it may concern:*

Be it known that I, GEORGE A. WALKER, a citizen of the United States, residing at Jet, in the county of Woods, State of Oklahoma, have invented certain new and useful Improvements in Ice-Tongs; and I do hereby declare the following to be a full, clear, and exact description of the invention, such as will enable others skilled in the art to which it appertains to make and use the same.

This invention has reference to ice tongs, and it aims to provide an exceedingly simple and inexpensive implement of that class upon which an ice pick and a saw are likewise formed, whereby the implement may be utilized in carrying a block of ice from one point to another, as well as in sawing and splitting the same into small pieces after their destination has been reached.

To this end the invention consists in the particular construction, combination, and arrangement of parts, all as hereinafter fully described, specifically claimed and illustrated in the accompanying drawing in which a front elevation of the implement is shown.

In its practical embodiment the implement comprises a pair of arms 5 and 6 which are pivoted together scissors fashion, towards the handle portions. The shape of the arm differs from that of the arm of an ordinary pair of ice tongs in that the operating portion of the latter are bowed while in the present instance, the operating portion of each arm is approximately straight, as shown.

The arm 5 is provided upon its outer edge with a series of laterally projecting teeth 7, to form a saw, while upon the free end of the arm and extending in alinement therewith, there is formed a spike 8 which tapers to a point, the sides of the spike being provided with longitudinal grooves or channels 9. Adjacent the base of the spike or pick there is formed upon the inner edge of said arm a single tooth 10 which projects laterally towards the free end of the arm 6, which is likewise provided with a correspondingly located tooth 11.

From the foregoing description it will be apparent that a block of ice may be carried from one point to another, and deposited in the ice box, or other receptacle, by engaging the teeth 10 and 11 therewith in the usual manner. The block, when its destination has been reached, can be sawed into smaller blocks which may be split or broken into pieces of the desired size by the spike 8.

The edges of the grooves or channels which are formed in the spike are preferably sharpened so as to provide cutting edges, or in other words the spike is scalloped in cross section. It is to be understood, however, that instead of channeling the spike the cutting edges may be provided by forming the spike in the shape of a pyramid.

What is claimed, is,

1. The combination, in an ice implement of a pair of pivoted arms, a series of saw-teeth formed upon the outer edge of one of said arms, a longitudinally-extending tapered spike formed on the outer end of said arm, a laterally-extending tooth formed on the inner edge of said arm adjacent the base of said spike, and a laterally-projecting tooth formed on the inner edge of the other arm directly opposite the last-mentioned tooth and extending towards the same.

2. The combination, in an ice implement, of a pair of pivoted arms, the operating portion of each arm lying in a straight line, a longitudinally extending spike formed on the outer end of one of said arms and provided with a series of longitudinal cutting edges, a series of saw teeth formed upon the outer edge of said arm, a laterally extending tooth formed on the inner edge of said arm adjacent the base of said spike, and a laterally-projecting tooth formed on the inner edge of the other arm directly opposite the last-mentioned tooth and extending towards the same.

In testimony whereof, I affix my signature, in presence of two witnesses.

GEORGE A. WALKER.

Witnesses:
CHAS. T. POWELL,
F. P. CARY.